United States Patent
Inagaki et al.

(10) Patent No.: US 10,678,222 B2
(45) Date of Patent: Jun. 9, 2020

(54) DATA COLLECTION DEVICE AND COMPUTER READABLE MEDIUM

(71) Applicant: FANUC CORPORATION, Minamitsuru-gun, Yamanashi (JP)

(72) Inventors: Keitarou Inagaki, Yamanashi (JP); Junichi Tezuka, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 124 days.

(21) Appl. No.: 15/885,100

(22) Filed: Jan. 31, 2018

(65) Prior Publication Data

US 2018/0239339 A1 Aug. 23, 2018

(30) Foreign Application Priority Data

Feb. 22, 2017 (JP) ................................ 2017-031074

(51) Int. Cl.
*G05B 19/418* (2006.01)

(52) U.S. Cl.
CPC ..... *G05B 19/4183* (2013.01); *G05B 19/4184* (2013.01); *G05B 19/41855* (2013.01); *Y02P 90/02* (2015.11)

(58) Field of Classification Search
CPC ............ G05B 19/4183; G05B 19/4184; G05B 19/41855; Y02P 90/02; H04L 67/322; H04Q 9/00

See application file for complete search history.

(56) References Cited

U.S. PATENT DOCUMENTS

| 6,587,812 B1 | 7/2003 | Takayama |
| 6,788,994 B2 | 9/2004 | Nakazawa et al. |

(Continued)

FOREIGN PATENT DOCUMENTS

| CN | 1906550 | 1/2007 |
| CN | 102356645 | 2/2012 |

(Continued)

OTHER PUBLICATIONS

Notification of Reasons for Refusal dated Sep. 4, 2018 in corresponding Japanese Patent Application No. 2017-031074, with partial English translation.

(Continued)

*Primary Examiner* — Kyle R Quigley
(74) *Attorney, Agent, or Firm* — Wenderoth, Lind & Ponack, L.L.P.

(57) ABSTRACT

To reliably collect measured data without requiring a large-capacity storage device. A data collection device which is connected with a plurality of machine tools via a network includes: a priority calculation means for calculating a degree of relative priority for each of the plurality of machines tools, based on information related to a state of each of the machine tools; and a measured data collection means for deciding, in a case of receiving a collection request of measured data for the machine tool, which machine tool among the machine tools corresponding to the collection request to set as a collection target of the measured data based on the degree of relative priority, and for collecting the measured data from the machine tool decided as the collection target via the network.

5 Claims, 4 Drawing Sheets

(56) References Cited

U.S. PATENT DOCUMENTS

| | | | | |
|---|---|---|---|---|
| 2003/0229414 A1* | 12/2003 | Nakazawa | ............ | G05B 19/408 |
| | | | | 700/175 |
| 2007/0067678 A1* | 3/2007 | Hosek | ................ | G05B 23/0235 |
| | | | | 714/25 |
| 2013/0211782 A1* | 8/2013 | Rosenberg | ................. | B25J 9/16 |
| | | | | 702/182 |
| 2015/0244826 A1* | 8/2015 | Stenneth | .................. | H04Q 9/00 |
| | | | | 709/213 |
| 2015/0293523 A1 | 10/2015 | Yamamoto et al. | | |

FOREIGN PATENT DOCUMENTS

| | | |
|---|---|---|
| CN | 104620181 | 5/2015 |
| CN | 104995481 | 10/2015 |
| DE | 10 2016 106 085 | 10/2016 |
| EP | 1 162 524 | 12/2001 |
| JP | 9-248739 | 9/1997 |
| JP | 2000-210800 | 8/2000 |
| JP | 2001-350510 | 12/2001 |
| JP | 2004-13665 | 1/2004 |
| JP | 2015-203646 | 11/2015 |
| JP | 2016-200928 | 12/2016 |

OTHER PUBLICATIONS

Koutarou Kuwazu, "All that IT engineers should know now—*IoT becoming a reality*", Nikkei Systems, No. 278, Japan, Nikkei Business Publications, Inc., Jun. 2016, p. 34, center column, line 3 to right column, line 22 (see partial English translation of document CA).

Office Action dated Jun. 21, 2019 in CN Patent Application No. 201810147124.0.

Office Action dated Jun. 25, 2019 in DE Patent Application No. 10 2018 202 087.6.

* cited by examiner

FIG. 2
EXAMPLE IN WHICH ERROR INCREASES WITH AGING: BACKLASH
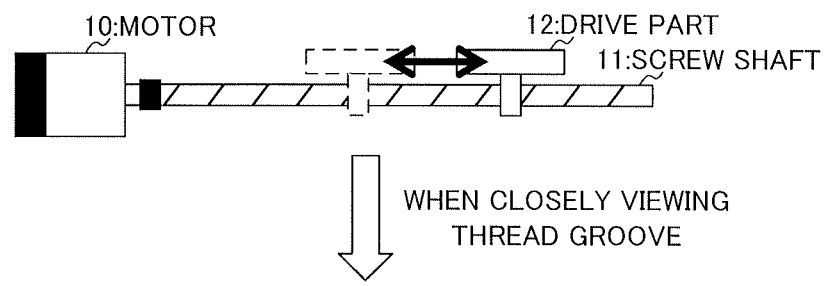
WHEN CLOSELY VIEWING THREAD GROOVE
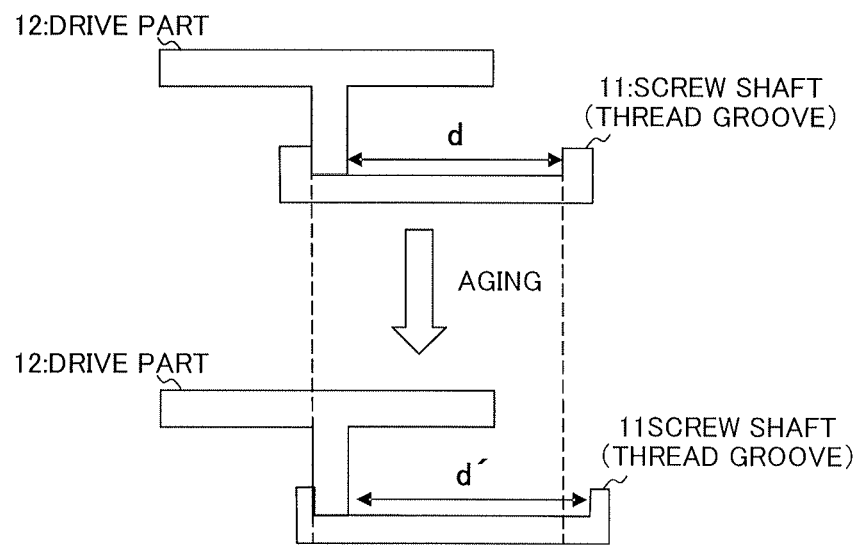
BACKLASH WIDENS DUE TO FRICTION WITH AGE

DATA COLLECTION DEVICE AND COMPUTER READABLE MEDIUM

This application is based on and claims the benefit of priority from Japanese Patent Application No. 2017-031074, filed on 22 Feb. 2017, the content of which is incorporated herein by reference.

BACKGROUND OF THE INVENTION

Field of the Invention

The present invention relates to a data collection device and computer readable medium for collecting measured data for a machine tool or the like.

Related Art

Conventionally, the matter of executing a test run in a machine tool, and collecting measured data measured during execution of this test run is widely carried out. By analyzing the measured data collected in this way with a higher-order device, for example, it is possible to discover the deterioration of components occurring due to aging of the machine tool, symptoms of failure, etc.

This measured data is sent from a numerical control device which controls the machine tool to a higher-order device via a network such as a LAN (Local Area Network) constructed in a factory. Herein, in the case of the sampling period of measured data being comparatively long, no particular problems arise since the data volume for the measured data is also small. However, in a case such as collecting measured data at a short sampling period (for example, period of several tens of microseconds or several milliseconds), since the data volume for the measured data becomes large, a problem arises in that congestion occurs in the network, transmission delays occur, and measured data is lost.

Technology made taking account of the occurrence of such network congestion is disclosed in Patent Document 1 and Patent Document 2. More specifically, Patent Document 1 describes the matter of connecting a storage device to each of the machine tools in a factory, temporarily saving measured data measured from the machine tools in this storage device, and then sending to a higher-order device. Patent Document 2 describes the matter of storing measured data as waveform data that is consecutive in a time series, and sending the stored waveform data to the higher-order device.

With these technologies of Patent Document 1 and Patent Document 2, by providing a buffer by way of the storage device in this way, it is no longer necessary to send the measured data in real-time. For this reason, since it becomes possible to temporally distribute and send measured data in response to the state of the network, the occurrence of network congestion can be prevented.

Patent Document 1:
Japanese Unexamined Patent Application, Publication No. 2004-013665
Patent Document 2:
Japanese Unexamined Patent Application, Publication No. 2000-210800

SUMMARY OF THE INVENTION

The aforementioned technologies of Patent Document 1 and Patent Document 2 both provide a buffer by way of a storage device. However, in a case such that the data volume of measured data is large, the matter of preparing a storage device of a storage capacity corresponding to this data volume is linked to an increase in cost. In addition, the machine tool may be used for a long time (for example, 10 years or more), and for past machine tools, there are also cases where it is not possible to sufficiently expand the storage capacity of the storage device due to the standard thereof.

Therefore, the present invention has an object of providing a data collection device and data collection program which reliably collect measured data without requiring a large-capacity storage device.

A data collection device (e.g., the data collection device 300 described later) according to a first aspect of the present invention is a data collection device connected with a plurality of machine tools (e.g., the machine tool 100 described later) via a network (e.g., the network 500 described later), including: a priority calculation means (e.g., the priority calculation unit 320 described later) for calculating a degree of relative priority for each of the plurality of machines tools, based on information related to a state of each of the machine tools; and a measured data collection means (e.g., the measured data collection unit 310 described later) for deciding, in a case of receiving a collection request of measured data for the machine tool, which machine tool among the machine tools corresponding to the collection request to set as a collection target of the measured data based on the degree of relative priority, and for collecting the measured data from the machine tool decided as the collection target via the network.

According to a second aspect of the present invention, the data collection device as described in the first aspect may be configured as a data collection device in which the measured data collection means decides an upper limit number of machine tools to set as collection targets of the measured data simultaneously, based on at least a state of the network and/or load of the data collection device, and in a case of the number of machine tools corresponding to the collection request exceeding the upper limit number, sets a number of machine tools to be collection targets of the measured data simultaneously as a number no more than the upper limit number, based on the degree of relative priority.

According to a third aspect of the present invention, the data collection device as described in the first or second aspect may be configured as a data collection device in which the measured data collected from each of the machine tools is included in information related to the state of each of the machine tools for calculating the degree of relative priority by the priority calculation means.

According to a fourth aspect of the present invention, the data collection device as described in the third aspect may be configured as a data collection device in which the priority calculation means calculates an estimated error related to a machining process for each of the plurality of machine tools, based on the measured data collected from each of the machine tools, and decides the degree of relative priority so that the degree of relative priority becomes higher for a machine tool having a higher calculated estimated error.

According to a fifth aspect of the present invention, the data collection device as described in the third aspect may be configured as a data collection device in which a demanded precision is set for each of the plurality of machine tools, and the priority calculation means calculates an estimated error related to a machining process for each of the plurality of machine tools based on the measured data collected from each of the machine tools, and decides the degree of relative priority so that the degree of relative priority becomes higher for a machine tool having a higher value of a ratio between a value of the estimated error calculated and a value of the demanded precision that is set.

According to a sixth aspect of the present invention, the data collection device as described in the fifth aspect may be configured as a data collection device in which the priority calculation means calculates an extent of change in the value of the ratio in the past, for each of the plurality of machine tools, and in a case of the value of the ratio in the future changing by the extent of change calculated, decides the degree of relative priority so that the degree of relative priority becomes higher for a machine tool for which a timing at which the value of the ratio in the past exceeds a predetermined value is reached faster.

According to a seventh aspect of the present invention, the data collection device as described in any one of the first to sixth aspects may be configured as a data collection device in which the measured data collection means causes operation for collecting the measured data to be performed in a machine tool decided as the collection target of the measured data based on the degree of relative priority, and collects information representing a physical quantity which changes accompanying the operation as the measured data.

According to an eighth aspect of the present invention, the data collection device as described in the seventh aspect may be configured as a data collection device in which the measured data collection means collects the measured data in real-time while the machine tool is executing the operation.

A data collection program according to a ninth aspect of the present invention is a data collection program for causing a computer to function as a data collection device (e.g., the data collection device 300 described later), the data collection device being connected with a plurality of machine tools (e.g., the machine tool 100 described later) via a network (e.g., the network 500 described later), and including: a priority calculation means (e.g., the priority calculation unit 320 described later) for calculating a degree of relative priority for each of the plurality of machines tools, based on information related to a state of each of the machine tools; and a measured data collection means (e.g., the measured data collection unit 310 described later) for deciding, in a case of receiving a collection request of measured data for the machine tool, which machine tool among the machine tools corresponding to the collection request to set as a collection target of the measured data based on the degree of relative priority, and for collecting the measured data from the machine tool decided as the collection target via the network.

According to the present invention, it becomes possible to reliably collect measured data, without requiring a large-capacity storage device.

BRIEF DESCRIPTION OF THE DRAWINGS

FIG. 2 provides drawings illustrating an example in which the error becomes larger with aging of a machine tool;

DETAILED DESCRIPTION OF THE INVENTION

First, a summary of an embodiment of the present invention will be explained. In the embodiment of the present invention, the degree of relative priority is calculated for each of a plurality of machine tools, and the number of machine tools serving as the target for performing a test run is limited based on this degree of relative priority. It thereby becomes possible to prevent the occurrence of network congestion, and reliably collection measured data, even in a case such that the data volume for measured data is large, for example. In addition, it is also no longer necessary to provide a large-capacity storage device for buffering. The above is a summary of an embodiment of the present invention.

First Embodiment

Figure 1:
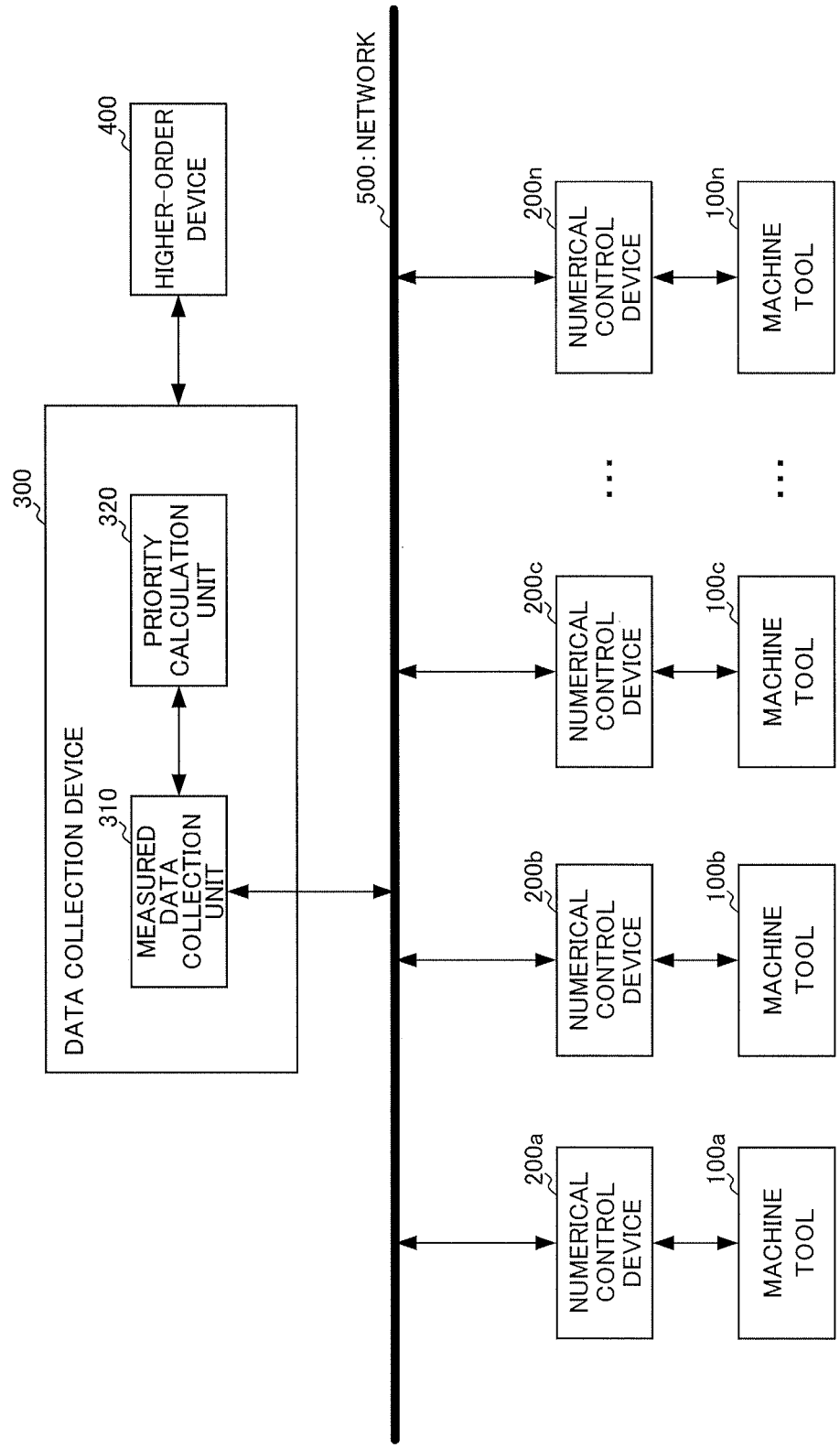
FIG. 1 is a block diagram showing a basic configuration of an overall embodiment of the present invention.

FIG. 1 shows the overall configuration of a machine tool management system 1, which is the present embodiment. The present embodiment shown in FIG. 1 includes: n-number of machine tools (machine tool 100a to machine tool 100n), n-number of numerical control devices (numerical control device 200a to numerical control device 200n), a data collection device 300, a higher-order device 400, and a network 500. It should be noted that n is any natural number.

Each machine tool 100 and each numerical control device 200 are made into one-to-one groups, and connected to be mutually communicable. In addition, each of the numerical control devices 200 is communicably connected with the data collection device 300 via the network 500. Herein, the network 500 is realized by a network such as a LAN (Local Area Network) constructed within a factory.

Furthermore, the data collection device 300 and higher-order device 400 are also communicably connected. It should be noted that, in the drawings, although the data collection device 300 and higher-order device 400 are directly connected, the data collection device 300 and higher-order device 400 may be communicably connected via the network 500.

Next, the functions of each of these devices will be explained. It should be noted that, since each of the machine tools 100 has respectively equivalent functions, in the case of explaining without specifying any of the machine tools 100, an explanation will be made abbreviating the alphabetic letter at the end of the reference symbol and calling as machine tool 100. Similarly, since the numerical control devices 200 have respectively equivalent functions, in the case of explaining without specifying any of the numerical control devices 200, an explanation will be made abbreviating the alphabetic letter at the end of the reference symbol and calling as numerical control device 200.

The machine tool 100 is a device that performs predetermined machine processing such as cutting, and test running for acquiring measured data, based on the control of the numerical control device 200. The machine tool 100 includes a motor that drives for machining a work, a spindle and feed shaft mounted to this motor, and a jig, tool or the like corresponding to each of these shafts. Then, the machine tool 100 performs predetermined machine processing or test running by causing the motor to drive based on operation commands outputted from the numerical control device 200.

Herein, there is no particular limitation in the contents of the predetermined machine processing, and may be other machining other than cutting, such as grinding, polishing, rolling or forging, for example. In addition, test running is running performed for acquiring measured data collected by the data collection device 300, and although it may accompany machining of a work, it may not accompanying machining of a work.

In addition, measured data collected by the data collection device 300 is data showing a physical quantity related to the position, speed, acceleration, torque, etc. of a drive shaft of the machine tool 100, for example. The measured data is measured by various sensors installed to the machine tool 100, or various sensors installed in the vicinity of the machine tool 100. Various sensors are a rotary encoder or linear encoder for calculating the position of the drive shaft, amperemeter that measures the electric current flowing in the motor, acceleration sensor for measuring vibrations acting on the drive shaft, and a temperature sensor for detecting overheating of the drive shaft.

It should be noted that the machine tool 100 can be realized by a general machine tool, without requiring to be particularly unique to the present embodiment. In addition, the machine tool 100 may be configured to be realized by a robot or the like that operates within a factory, for example, without being realized in a machine for machining according to numerical control.

The numerical control device 200 is a device for causing the predetermined machine processing or test running to be performed in the machine tool 100, by controlling the machine tool 100.

First, an explanation will be made for processing related to the predetermined machine processing by the numerical control device 200. The numerical control device 200 generates an operation command including a movement command related to each axis, spindle rotation command to the spindle motor for driving the spindle, etc. based on the machining program, and controls the driving of the motor of the machine tool 100, by sending the generated operation commands to the machine tool 100. The predetermined machine processing is thereby realized by the machine tool 100.

Next, an explanation will be made for processing related to test running by the numerical control device 200. The numerical control device 200, in the case of the predetermined machine processing not being performed by the current machine tool 100, and a predetermined time elapsing since execution of a previous test running, sends a test run request to the data collection device 300. The length of this predetermined time differs according to the type, application, etc. of the machine tool 100; however, it is set to 24 hours or 168 hours, for example. In the present embodiment, although there are cases where it is not possible to start test running immediately despite a test running request being performed, by setting to 24 hours or 168 hours, the test running will be performed in a period of roughly once a day, or a period of roughly once a week.

It should be noted that the numerical control device 200 may grasp the execution schedule of predetermined machine processing in the future. For example, it may be case such that how many times executing certain machine processing from a certain time is set in advance in the numerical control device 200. In this case, it may be configured so as to send the test running request to the data collection device 300 not in "case of the predetermined machine processing not being performed by the current machine tool 100, and a predetermined time elapsing since execution of a previous test running", but rather in a "case of there being no plan to perform predetermined machine processing for a sufficient time in order to perform test running, and a predetermined time elapsing since execution of the previous test running".

The numerical control device 200 continues sending of the test running request until an instruction of test running state is replied from the data collection device 300 in response to the test running request, or starting predetermined machine processing. Then, in response to this test running request, in the case of an instruction for test running start being replied from the data collection device 300, the numerical control device 200 generates an operation command for test running, and controls the driving of the motor of the machine tool 100 by sending the generated operation command to the machine tool 100. Test running thereby started by the machine tool 100. It should be noted that what kind of operation command for test running is generated may be instructed to the numerical control device 200 from the data collection device 300 for every event of test running, or may be stored in advance by the numerical control device 200.

Subsequently, the numerical control device 200, in the case of receiving an instruction of test running end from the data collection device 300, ends the generation and sending of operation commands, whereby test running by the machine tool 100 comes to an end.

The numerical control device 200 acquires measured data measured by the sensors from the sensors installed in the machine tool 100 during execution of the test running. Then, the numerical control device 200 outputs the measured data thus measured to the data collection device 300. The acquisition of measured data and output of acquired data are performed in real time during execution of test running by this numerical control device 200. For this reason, in the present embodiment, it is not necessary to provide a large-capacity storage device for buffering the measured data.

The data collection device 300 is a device for collecting measured data by causing test running to be executed in each of the machine tools 100. The data collection device 300 includes a measured data collection unit 310 and priority calculation unit 320, as shown in FIG. 1.

The measured data collection unit 310 sends the operation commands for performing test running to each of the numerical control devices 200. Then, by this operation command being given to each of the machine tools 100 via each of the numerical control devices 200, the respective machine tools 100 execute test running. Information indicating physical quantities such as the position, speed, acceleration and torque of the drive shaft which vary accompanying this test running is send to the measured data collection unit 310 from each of the numerical control devices 200 as measured data.

In this case, when the measured data is simultaneously send from all of the machine tools 100, the traffic load of the network 500 increases, and congestion occurs in the network 500. For this reason, in the present embodiment, it is configured not to perform test running simultaneously in all of the machine tools 100 issuing a test running request, but rather so as to perform test running simultaneously only in a number of the machine tools 100 of a degree not inducing congestion in the network 500.

More specifically, in the present embodiment, the upper limit for the number of machine tools 100 serving as the target of simultaneous test running is calculated in response to the transmission capacity of the network 500 (bandwidth), data volume of measured data, sampling period of measured data, processing power of the data collection device 300, etc. Then, in the case of the number of test running request being received exceeding the upper limit for the set number of machines, the test running is performed with the number of machine tools 100 no more than the upper limit of number of machines calculated as the target. In this case, which machine tool 100 to set as the target of test running is decided based on the degree of relative priority calculated by the priority calculation unit 320.

The priority calculation unit 320 is a portion calculating this degree of relative priority. The priority calculation unit 320 calculates the degree of relative priority based on information related to the state of the machine tool 100, such as the number of years passed of each machine tool 100, machining precision demanded in each machine tool 100, contents of measured data collected during previous test running, and elapsed time since previous test running. Then, the priority calculation unit 320 outputs the degree of relative priority thus calculated to the measured data collection unit 310. It should be noted that the detailed calculation method for the degree of relative priority will be described later by referencing FIGS. 2 and 3. The data collection device 300 sends the measured data collected in this way to the higher-order device 400.

The higher-order device 400 is a device that uses the measured data collected by the data collection device 300. For example, the higher-order device 400 performs failure prediction and/or failure detection based on the measured data collected by the data collection device 300. The method for this failure prediction, etc. may be any method, or may be a method such that compares the value included in the measured data and a predetermined threshold, and performs failure prediction, etc. based on the comparison result, for example. In addition, it may be a method that performs failure prediction, etc. using diagnostic data statistically, or may be a method that performs failure prediction, etc. by combining a well-known method such as that which further constructs and uses a learning model by way of machine learning, etc.

Explanations have been made above for the functions of each of the numerical control device 200, data collection device 300 and higher-order device 400. As the hardware configuration, each of the numerical control device 200, data collection device 300 and higher-order device 400 includes an arithmetic processing unit such as a CPU (Central Processing Unit). In addition, each of the numerical control device 200, data collection device 300 and higher-order device 400 includes an auxiliary storage device such as a HDD (Hard Disk Drive) storing various control programs, and a main storage device such as RAM (Random Access Memory) for storing data which is temporarily necessitated upon the arithmetic processing unit executing programs.

Then, the arithmetic processing unit reads applications and/or OS (Operating System) from the auxiliary storage device, and performs arithmetic processing based on this application and/or OS while expanding the read application and/or OS in the main storage device. In addition, various hardware included by the respective devices is controlled based on computation results thereof. In other words, each device included in the present embodiment can be realized by hardware and software cooperating.

For example, the numerical control device 200 can be realized by incorporating software for realizing the present embodiment into a common numerical control device. In addition, the data collection device 300 and higher-order device 400 can be realized by incorporating software for realizing the present embodiment into a general-purpose personal computer. It should be noted that, in the present embodiment, the data collection device 300 and higher-order device 400 are explained as separate devices; however, it may be configured so as to realize both the data collection device 300 and higher-order device 400 by a single device.

Next, an explanation will be made for the calculation method of the degree of relative priority performed by the priority calculation unit 320. As mentioned above, the priority calculation unit 320 calculates the degree of relative priority based on information related to the state of the machine tool 100, such as the number of years passing of each machine tool 100, machining precision demanded in each machine tool 100, contents of measured data collected during previous test running, and elapsed time since previous test running. For example, the degree of relative priority is calculated so that the degree of relative priority becomes higher with a longer number of years passing of each machine tool 100. In addition, the degree of relative priority is calculated so that the degree of relative priority becomes higher with a higher machining precision demanded in each machine tool 100. In addition, the degree of relative priority is calculated so that the degree of relative priority becomes higher for the measured data collected during the previous test running being measured data representing a state less preferred. In addition, the degree of relative priority is calculated so that the degree of relative priority becomes higher with a longer elapsed time since the previous test running. In addition to this, the degree of relative priority can be calculated by any of the three methods explained below, for example.

As the first method by which the priority calculation unit 320 calculates the degree of relative priority, a method is considered such that calculates the estimated error for the machine tool 100 based on the measured data during the test running previously performed, and raises the degree of relative priority for a machine tool 100 with a greater value of calculated estimated error. Estimated error, for example, is an estimated value for the error between the position, speed or torque of the feed shaft set as the goal by control based on the operation command, and the actual position, speed or torque of the feed shaft.

In order to calculate the estimated error, the numerical control device 200 generates an operation command for test running based on the machining program for test running. Then, the motor of the machine tool 100 is driven by sending the generated operation command to the machine tool 100. Herein, although some error occurs based on the rattling, etc. during factory shipment, in the case of aging not occurring, the machine tool 100 will operate with almost no error with the set point of this operation command. For example, the feed shaft stops in the vicinity of a position based on the set point of the operation command. However, since the rattling, etc. increases when the machine tool 100 ages, the feed shaft will come to stop not at the position based on the set point of the operation command, but rather at a position greatly shifted from the position based on the set point. Therefore, during test running, the stop position of the feed shaft is measured by the sensor as measured data, for example, and the estimated error of the machine tool 100 is calculated based on the degree to which this stop position is shifted from the position based on the set point of the operation command.

An explanation will be made for the causes of error arising due to aging, by referencing FIG. 2 with the example of error arising related to backlash. FIG. 2 shows a mechanism that causes a drive part 12 to linearly move by causing the screw shaft 11 of the ball screw to rotate with the motor 10. This mechanism is a mechanism commonly used in the feed shaft of the machine tool 100.

Herein, when closely viewing the thread groove of the screw shaft 11, backlash is provided in the thread groove between the drive part 12 and screw shaft 11 in order to allow the screw shaft 11 to rotate without strain. The width of this backlash shall initially be a predetermined width (shown by d in the drawings). However, by repeating the driving of the drive part 12, it ages, the thread groove wears, the width of backlash becomes wider than the initial width, and becomes a wider width (shown by d' in the drawings). It thereby becomes a cause for error arising. In the present embodiment, it is estimated that the error became greater in this way based on the measured data representing a physical quantity related to the position, speed, acceleration, torque, etc. of the drive shaft, as mentioned above.

Then, in the case of the value for the estimated error being large, since it is considered that the machining precision is falling because of aging, etc., it is desired to collect measured data as the target of performing test running preferentially. Therefore, the first method raises the degree of relative priority for a machine tool 100 having a greater value of estimated error. It should be noted that FIG. 2 used in the aforementioned explanation is a drawing illustrated for simplifying understanding of the explanation, and the proportions, etc. of each part differ from the actual parts.

Next, an explanation will be made for a second method of calculating the degree of relative priority. In a case such the respective machine tools 100 are the same type of machine tools performing the same machining process, no problems arise with the first method. However, in a case such that the respective machine tools 100 are different types of machine tools performing different machining processes, since the precision demanded in the machine tool 100 will also differ, it is preferable to also consider this demanded precision in addition to the estimated error. Therefore, the second method calculates an "ERR ratio" based on the following Formula 1.

ERR ratio=estimated error/demanded precision of machine tool 100 (Formula 1)

As understood from Formula 1, the ERR ratio is the value for the ratio between the value of the estimated error and the value of precision demanded in the machine tool 100. This ERR ratio is a value indicating to what extent the precision demanded in the machine tool 100 is satisfied. Herein, the demanded precision of the machine tool 100 is set for every machine tool 100. For example, it is set so that the demanded precision of a machine tool 100 performing finish machining is higher than the demanded precision of a machine tool 100 performing rough machining. Even if the value for the estimated error is the same value, the value of the ERR ratio will thereby also increase as the machine tool 100 has a higher demanded precision.

Then, since it is considered that the demanded precision will not be satisfied for a greater calculated value for the ERR ratio, it is desirable to collect measured data as the target of performing test running preferentially. Therefore, the second method raises the degree of relative priority for a machine tool 100 having a greater value of ERR ratio.

Next, as a third method of calculating the degree of relative priority, it is considered not to calculate the degree of relative priority based on the value of the ERR ratio at a certain moment, but rather to calculate the degree of relative priority based on the extent of change in the value of the ERR ratio along a time series. More specifically, based on the value of the ERR ratio calculated based on the measured data collected up until the time of the previous test running, the extent of change in the ERR ratio is obtained, and in the case of assuming that the ERR ratio with this extent of change in ERR ratio has changed, the degree of relative priority is raised for a machine tool 100 having an earlier timing of reaching "value of estimated error=value of demanded precision of machine tool".

Figure 3:
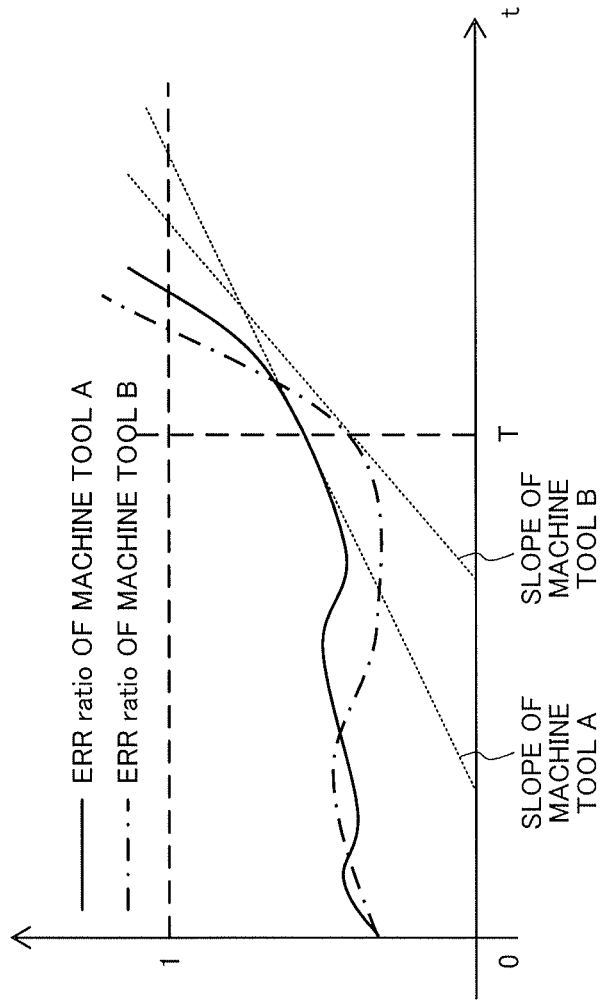
FIG. 3 is a graph illustrating an ERR ratio of the embodiment of the present invention.

An explanation will be made for this point by referencing FIG. 3. FIG. 3 is a graph showing an aspect of the change in value of the ERR ratio accompanying the elapse of time of two machine tools 100 (machine tool A and machine tool B), and is a two-axis graph with the vertical axis as the value of ERR ratio and the horizontal axis as time. In the drawings, the previous measurement timing of measured data is illustrated as timing T.

Then, as shown in FIG. 3, the slope is obtained for the value of the ERR ratio at timing T, which is the previous measurement timing of measured data for each of the respective machine tools 100. This slope corresponds to the extent of change in the value of the ERR ratio for each of the respective machine tools 100.

Then, in the case of assuming that the ERR ratio with this slope has changed, the degree of relative priority is raised with a machine tool 100 having an earlier timing of reaching "value of estimated error=value of demanded precision in machine tool". Since the machine tool B has an earlier timing of reaching "value of estimated error=value of demanded precision in machine tool" than the machine tool A in the example of the drawings, the degree of relative priority of the machine tool B is elevated. Herein, reaching "value of estimated error=value of demanded precision in machine tool" is the matter of becoming a limit value at which the error that is estimated satisfies the demanded precision.

By configuring in this way, it is possible to, rather than calculate the degree of relative priority based on the value of the ERR ratio at a certain moment, calculate the degree of relative priority based on the extent of change in the value of the ERR ratio along the time series. It is thereby possible to set the machine tool 100, for which the extent of change in the value of the estimated error suddenly increases and is considered to have any problem arising, as the target for performing test running preferentially, for example.

Figure 4:
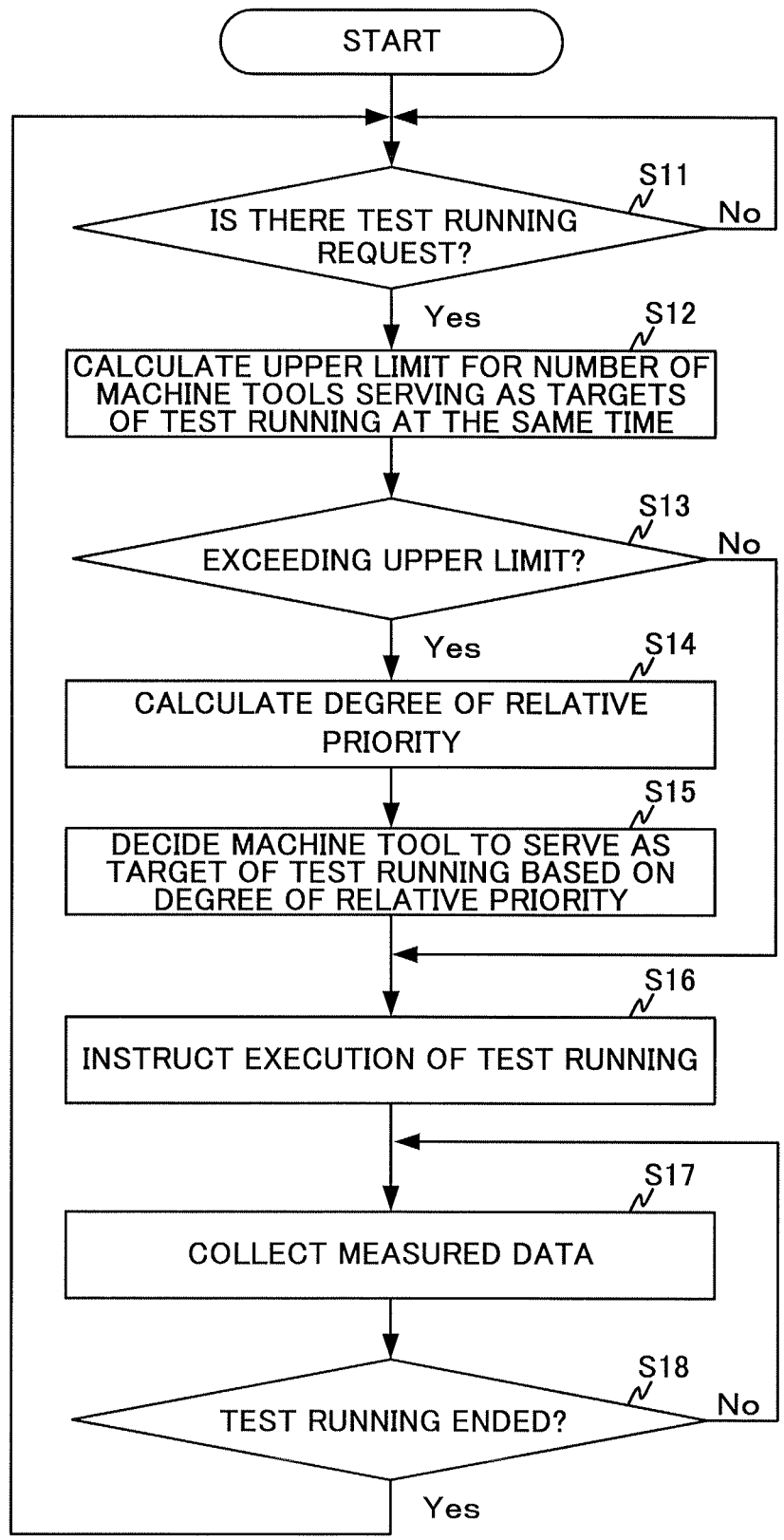
FIG. 4 is a flowchart showing basic operations of the embodiment of the present invention.

Next, an explanation will be made for operations of the present embodiment by referencing the flowchart of FIG. 4. In Step S11, the measured data collection unit 310 determines whether a test running request is currently being received from any of the numerical control devices 200. In the case of not currently receiving a test running request from any of the numerical control devices 200, it is determined as NO in Step S11, and determination continues without performing any particular processing. On the other hand, in the case of the measured data collection unit 310 currently receiving a test running request from any of the numerical control devices 200, it is determined as YES in Step S11, and the processing advances to Step S12.

In Step S12, the measured data collection unit 310 calculates the upper limit for the number of machine tools 100 to serve as the target of test running at the same time. Calculation is performed based on the transmission capacity (bandwidth) of the network 500, data volume of the measured data, sampling period of measured data, processing power of the data collection device 300, etc., as mentioned above.

In Step S13, it is determined whether the number of numerical control devices 200 currently sending the test running request is exceeding the upper limit for the number of machine tools 100 serving as the target of test running calculated in Step S12. In the case of not exceeding the upper limit, it is determined as NO in Step S13, and the processing advances to Step S16. On the other hand, in the case of exceeding the upper limit, it is determined as YES in Step S13, and the processing advances to Step S14.

In Step S14, the priority calculation unit 320 calculates the degree of relative priority. The calculation method is as mentioned above. The degree of relative priority thus calculated is outputted to the measured data collection unit 310.

In Step S15, the measured data collection unit 310 decides which machine tool 100 to set as the machine tool 100 serving as a target of test running based on the degree of relative priority. For example, in the determination of Step S11, in the case of the number of numerical control devices 200 making a test running request (i.e. number of machine tools 100 corresponding to this numerical control device 200) being 10, and the number of machine tools 100 serving as the target of test running calculated in Step S12 being 5, five machines in order of highest degree of relative priority are decided as the machine tools 100 to serve as the targets of test running.

In Step S16, the measured data collection unit 310 performs a start instruction for test running relative to the numerical control devices 200 corresponding to the machine tools 100 serving as the targets of test running. The numerical control device 200 accepting the start instruction generates an operation command for test running, and outputs the generated operation command to the machine tool 100 corresponding to its own numerical control device 200, thereby controlling driving of the motor of the machine tool 100. The test running is thereby started by the machine tool 100.

In Step S17, the measured data collection unit 310 collects measured data from the numerical control device 200. More specifically, the numerical control device 200 acquires measured data for the machine tool 100 in the middle of executing test running from the sensors, and sends the acquired measured data to the data collection device 300 via the network 500. By configuring in this way, the measured data collection unit 310 collects measured data for each of the respective machine tools 100 serving as the target of test running.

In Step S18, the measured data collection unit 310 determines whether or not to end test running. For example, it is determined to end test running on the condition of continuously performing operations for test running a predetermined number of times, or continuously performing test running for a predetermined time. In the case of the condition for ending test running still not being satisfied, the determination is NO in Step S18, and the collection of measured data is continued in Step S17. On the other hand, in the case of the condition for ending test running being satisfied, it is determined as YES in Step S18, and the measured data collection unit 310 sends an instruction of test running end to the numerical control device 200. In the numerical control device 200 having received this instruction, the generation and sending of operation commands ends, and the test running by the machine tool 100 thereby comes to an end. Then, the measured data collection unit 310 returns to Step S11 and repeats the processing. It thereby becomes possible to execute test running in a machine tool 100 other than the machine tool 100 serving as the target of test running this time.

An explanation for operations of the present embodiment has been made above. The present embodiment calculates the degree of relative priority for each of the plurality of machine tools 100 in this way, and sets the number of machine tools 100 to serve as the target of performing test running to a limited number of machines, based on this degree of relative priority. It thereby exerts an effect in making possible to prevent the occurrence of congestion in the network 500, and reliably collect measured data, even in a case such that the data volume of the measured data is large, for example. In addition, it also exerts an effect in no longer requiring to provide a large-capacity storage device for buffering. Furthermore, with the present embodiment, the data collection device 300 can specify which machine tool 100 is a machine tool 100 that should perform test running, by receiving a test running request sent by the numerical control device 200. For this reason, it also exerts an effect in that it is not necessary for the data collection device 300 to manage which machine tool 100 is a machine tool 100 that should perform test running.

Additionally, it also exerts an effect in that, by calculating the degree of relative priority using the ERR ratio as mentioned above, it is possible to calculate the degree of relative priority upon considering the differences in precision demanded in every machine tool 100.

In addition, as explained referencing FIG. 3, by further considering the extent of change in the ERR ratio, it also exerts an effect in that it is possible to establish a machine tool 100 for which the extent of change in the value of estimated error suddenly increases and some problem is considered to be occurring, as the target of performing test running preferentially.

It should be noted that each device included in the above-mentioned respective embodiments can be realized by hardware, software or a combination of these. In addition, the data collection method performed by each device included in the above-mentioned respective embodiments cooperating can also be realized by hardware, software or a combination of these. Herein, being realized by software indicates the matter of being realized by a computer reading out and executing programs.

The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation is possible in modes achieved by conducting various modifications in a scope not departing from the gist of the present invention. For example, implementation is possible in a form established by conducting modifications such as the following modified examples.

First Modified Example

The contents of the test running may be made to differ for every machine tool 100. For example, it may be configured so that the contents of the test running differ between a machine tool 100 performing a first machining process, and a machine tool 100 performing a second machining process. In the case of performing different test running in this way, even if trying to start test running at the same timing, the end timing of the test running will differ depending on the contents of the test running.

Therefore, it is good to establish machine tools 100 having the same contents of test running as one group, and perform test running from machine tools 100 having a high degree of relative priority in this group unit. If configured in this way, since the test running can end at the same timing in every group, it is possible to simultaneously collect measured data for a plurality of the machine tools 100 performing the same test running.

In addition, without performing grouping based on the contents of the test running, it may be configured so that, whenever test running ends for one machine tool 100 test running is started in one machine tool 100 having the next highest degree of relative priority. In this case, it is possible to perform test running of different contents in parallel.

Second Modified Example

In addition, it is possible to modify the configuration of the aforementioned embodiment. For example, with the aforementioned embodiment, although it is assumed to realize the data collection device 300 and higher-order device 400 by separate devices, it may be configured so as to realize these by the same device. In addition, it may be configured so as to realize each of the data collection device 300 and higher-order device 400 not by one device, but rather by a plurality of devices. Furthermore, it may be configured so that the data collection device 300 and/or higher-order device 400 are installed at a remote location separated from the factory or the like in which the machine tools 100 and numerical control devices 200 are installed. In this case, the network 500 may be a network further including a public network such as the Internet.

EXPLANATION OF REFERENCE NUMERALS

1 machine tool management system
100 machine tool
200 numerical control device
300 data collection device
310 measured data collection unit
320 priority calculation unit
400 higher-order device
500 network

What is claimed is:

1. A data collection device connected with a plurality of machine tools via a network, the data collection device comprising:
   a priority calculation means for calculating a degree of relative priority for each of the plurality of machines tools, based on information related to a state of each of the machine tools that is previously received; and
   a measured data collection means for deciding, in a case of receiving a collection request of measured data for the machine tool, which machine tool among the machine tools corresponding to the collection request to set as a collection target of the measured data based on the degree of relative priority, and for collecting the measured data from the machine tool decided as the collection target via the network,
   wherein the measured data collected from each of the machine tools is included in information related to the state of each of the machine tools for calculating the degree of relative priority by the priority calculation means,
   wherein a demanded precision is set for each of the plurality of machine tools,
   wherein the priority calculation means calculates an estimated error related to a machining process for each of the plurality of machine tools, based on the measured data collected from each of the machine tools, and decides the degree of relative priority so that the degree of relative priority becomes higher for a machine tool having a higher value of a ratio between a value of the estimated error calculated and a value of the demanded precision that is set,
   wherein the measured data collection means causes operation for collecting the measured data to be performed in a machine tool decided as the collection target of the measured data based on the degree of relative priority, and
   collects information representing a physical quantity which changes accompanying the operation as the measured data.

2. The data collection device according to claim 1,
   wherein the measured data collection means decides an upper limit number of machine tools to set as test run collection targets of the measured data simultaneously, based on at least a state of the network and/or load of the data collection device, and
   in a case of the number of machine tools corresponding to the test run collection request exceeding the upper limit number, sets a number of machine tools to be test run collection targets of the measured data simultaneously as a number no more than the upper limit number, based on the degree of relative priority.

3. The data collection device according to claim 1,
   wherein the priority calculation means calculates an extent of change in the value of the ratio in the past, for each of the plurality of machine tools, and
   in a case of the value of the ratio in the future changing by the extent of change calculated, decides the degree of relative priority so that the degree of relative priority becomes higher for a machine tool for which a timing at which the value of the ratio in the past exceeds a predetermined value is reached faster.

4. The data collection device according to claim 1,
   wherein the measured data collection means collects the measured data in real-time while the machine tool is executing the operation.

5. A non-transitory computer readable medium encoded with a data collection program for causing a computer to function as a data collection device,
   wherein the data collection device is connected to a plurality of machine tools via a network, and comprises:
   a priority calculation means for calculating a degree of relative priority for each of the plurality of machines tools, based on information related to a state of each of the machine tools that is previously received; and
   a measured data collection means for deciding, in a case of receiving a collection request of measured data for the machine tool, which machine tool among the machine tools corresponding to the collection request to set as a collection target of the measured data based on the degree of relative priority, and for collecting the measured data from the machine tool decided as the collection target via the network,
   wherein the measured data collected from each of the machine tools is included in information related to the state of each of the machine tools for calculating the degree of relative priority by the priority calculation means, wherein a demanded precision is set for each of the plurality of machine tools, wherein the priority calculation means calculates an estimated error related to a machining process for each of the plurality of machine tools, based on the measured data collected from each of the machine tools, and decides the degree of relative priority so that the degree of relative priority becomes higher for a machine tool having a higher value of a ratio between a value of the estimated error calculated and a value of the demanded precision that is set, wherein the measured data collection means causes operation for collecting the measured data to be performed in a machine tool decided as the collection target of the measured data based on the degree of relative priority, and collects information representing a physical quantity which changes accompanying the operation as the measured data.

\* \* \* \* \*